(12) United States Patent
Hatayama et al.

(10) Patent No.: US 6,560,381 B2
(45) Date of Patent: May 6, 2003

(54) OPTICAL FILTER

(75) Inventors: Hitoshi Hatayama, Yokohama (JP);
Masayuki Nishimura, Yokohama (JP);
Chisai Hirose, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/921,140

(22) Filed: Aug. 3, 2001

(65) Prior Publication Data

US 2002/0021856 A1 Feb. 21, 2002

(30) Foreign Application Priority Data

Aug. 3, 2000 (JP) .................................... 2000-235890

(51) Int. Cl.[7] ................ G02B 6/26; G02B 6/42
(52) U.S. Cl. .................. 385/15; 385/14; 385/40; 385/41; 359/341.41; 359/337.2; 359/161
(58) Field of Search ................ 385/14, 33, 40, 385/41, 42; 359/341.41, 337.2, 161, 179

(56) References Cited

U.S. PATENT DOCUMENTS 6,240,221 B1 * 5/2001 Thompson .................... 385/14
6,321,000 B1 * 11/2001 King .............................. 385/24
6,384,964 B1 * 5/2002 Mizuno ...................... 359/337.2

OTHER PUBLICATIONS

K.Inoue et al., "Tunable gain equalization using a Mach–Zehnder optical filter in multistage fiber amplifiers", IEEE Photonics Tech. Lett., 3(8), pp. 718–720(1991).*
Kyo Inoue et al., "*Tunable Gain Equalization using a Mach–Zehnder Optical Filter in Multistage Fiber Amplifiers*", IEEE, Photonics Technology Letters, vol. 3, No. 8, Aug. 1991, pp. 718–720.
Kiromi Toba et al., "*Demonstration of Optical FDM Based Self–Healing Ring Network Employing Arrayed–Waveguide–Grating ADM Filters and EDFAs*", ECOC, pp. 263–266.

* cited by examiner

*Primary Examiner*—Thong Nguyen
*Assistant Examiner*—Leo Boutsikaris
(74) *Attorney, Agent, or Firm*—McDermott, Will & Emery

(57) ABSTRACT

Three Mach-Zehnder interferometers 141 to 143 are connected in a series between an optical input terminal and an optical output terminal in an optical filter. Each interferometer is composed of two optical paths optical coupled at both ends by optical couplers. Only one interferometer has same optical path lengths between optical couplers. Heaters are disposed on each optical paths to allow the slope of transmission loss to change through the adjustment of the phase shift between those respective optical paths.

4 Claims, 6 Drawing Sheets

OPTICAL FILTER

BACKGROUND OF THE INVENTION

1. Field of the Invention

The present invention relates to an optical filter which is suitably employable as a gain equalizer for equalizing the gain of optical amplification of signal light, or the like in an optical amplifier.

2. Related Background Art

An optical amplifier includes an optical waveguide, doped with a fluorescent material excitable with pumping light, for optically amplifying signal light; and pumping means for supplying pumping light to the optical waveguide. Such an optical amplifier is provided in a repeating station in an optical transmission system, or the like. In particular, it is important for the optical amplifier employed in a wavelength division multiplexing transmission system for transmitting signal light of a plurality of channels to optically amplify the plurality of channels in a collective manner at respective gains equal to each other, and to output each channel of signal light with a power held at a constant target value. Hence, for equalizing the optical amplification of signal light in such an optical amplifier, an optical filter having a loss spectrum in a form similar to that of the gain spectrum in the amplifying optical waveguide is used as a gain equalizer.

For example, literature 1—K. Inoue, et al., "Tunable Gain Equalization Using a Mach-Zehnder Optical Filter in Multistage Fiber Amplifiers," IEEE Photonics Technology Letters, Vol. 3, No. 8, pp. 718–720 (1991)—and literature 2—H. Toba, et al., "Demonstration of Optical FDM Based Self-Healing Ring Network Employing Arrayed-Waveguide-Grating ADM Filters and EDFAs", ECOC '94, pp. 263–266 (1994)—disclose techniques for flattening the gain of an optical amplifier by means of an optical filter using a Mach-Zehnder interferometer. The techniques disclosed in these literatures aim at adjusting the respective temperatures of individual optical couplers and individual branching optical paths in a Mach-Zehnder interferometer according to the input signal light power, so as to regulate the slope of transmission loss to wavelengths in optical filter, thereby compensating for the fluctuation in the slope of gain to wavelengths accompanying the fluctuation in input signal light power.

SUMMARY OF THE INVENTION

In the above-mentioned conventional techniques, if the power of signal light outputted from the optical amplifier is to be kept constant when the loss in an optical transmission line in front of the optical amplifier fluctuates due to some reason and thereby the signal light fed into the optical amplifier alters its power, it will be necessary for the optical amplification of signal light in the optical amplifier to change its gain. When the gain is changed, the wavelength dependence of gain, i.e., the slope of gain to wavelengths (gain slope), may fluctuate, thereby deteriorating the gain flatness of optical amplifier, which causes the respective powers of a plurality of channels of signal light outputted from the optical amplifier to deviate from each other. Therefore, the respective temperatures of individual optical couplers and branching optical paths in each Mach-Zehnder interferometer constituting the optical filter are adjusted according to the input signal light power, so as to adjust the slope of loss to wavelengths (loss slope) in optical filter, thereby compensating for the fluctuation in gain slope accompanying the fluctuation in gain slope. When the loss slope in optical filter is changed according to the input signal light power, however, the loss level in the signal light wavelength band may fluctuate, whereby the signal light outputted from the optical amplifier after being optically amplified may fluctuate and deteriorate its S/N ratio.

In order to overcome the problems mentioned above, it is an object of the present invention to provide an optical filter which is suitably employable as a gain equalizer or the like in an optical amplifier, whereas its loss slope is easy to control.

For achieving the above-mentioned object, the optical filter in accordance with the present invention is an optical filter having variable wavelength-dependent transmission loss within given wavelength band comprising (1) an optical waveguide section composed of first, second and third Mach-Zehnder interferometers, each having two optical paths and two optical couplers for optical connecting said two optical paths each other at both end, these Mach-Zehnder interferometers are connected in series, and only one of the Mach-Zehnder interferometers having same optical path lengths between the optical couplers, (2) first, second and third temperature adjusting means, each disposed in at least one of optical paths between the optical couplers in respective first, second and third Mach-Zehnder interferometers, for adjusting the respective temperatures of the optical paths, and (3) control means, for independently controlling the absolute value and the slope of transmission loss by controlling respective temperatures of the optical paths with the temperature adjusting means.

This optical filter has transmission loss dependent on wavelength for light passing between the input terminal and the output terminal, and has a configuration of three Mach-Zehnder interferometers connected in series. Also, by adjusting the phase shift in each interferometer with adjusting the temperatures of each optical path using each respective temperature adjusting means, the absolute value of transmission loss in a given wavelength band (for example, the wavelength band of 1530 nm to 1565 nm, or alternatively, the wavelength band of 1574 nm to 1609 nm) and the slope of transmission loss for the wavelength are allowed to be controlled independently each other.

Alternatively, an optical filter according to the present invention is an optical filter having variable wavelength-dependent transmission loss within given wavelength band comprising (1) a single Mach-Zehnder interferometer composed of two optical paths having same optical path lengths and two optical couplers connected these optical paths each other, (2) a duplex Mach-Zehnder interferometer composed of main optical path connected one input or output end of the single Mach-Zehnder interferometer, sub optical path, end optical couplers disposed at both ends of the main and sub optical paths for optical coupling the main and sub optical path each other, and middle optical coupler disposed at middle position of the main and sub optical paths for optical coupling the main and sub optical path each other and the main optical path has different optical path lengths between adjacent optical couplers from the sub optical path each other, (3) a first temperature adjusting means disposed in at least one of optical paths between the optical couplers in said single Mach-Zehnder interferometer, for adjusting the temperature of the optical path, (4) second and third temperature adjusting means, each disposed in at least one of main or sub optical paths between the middle optical coupler and end optical couplers respectively in the duplex Mach-Zehnder interferometers, for adjusting the respective temperatures of the optical paths, and (5) controlling means, for independently controlling the absolute value and the slope of transmission loss by controlling respective temperatures of the optical paths with these temperature adjusting means.

This optical filter also has transmission loss dependent on wavelength for light passing between the input and the output terminal, and has a configuration of three Mach-Zehnder interferometer connected in series. Also, in this optical filter as well, by adjusting the phase shift in each interferometer with adjusting the temperature of each optical path using each respective temperature adjusting means, the absolute value of transmission loss in a given wavelength band (for example, the wavelength band of 1530 nm to 1565 nm, or alternatively, the wavelength band of 1574 nm to 1609 nm) and the slope of transmission loss for the wavelength are allowed to be controlled independently each other.

It is preferable that in an optical filter according to the present invention the bandwidth of the given wavelength band is 35 nm or wider, and the variable range of the absolute value of transmission loss in the given wavelength is 10 dB or more, and the absolute value of the slope of transmission loss in the given wavelength is variable at least within the range of 0 to 5 dB/35 nm.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
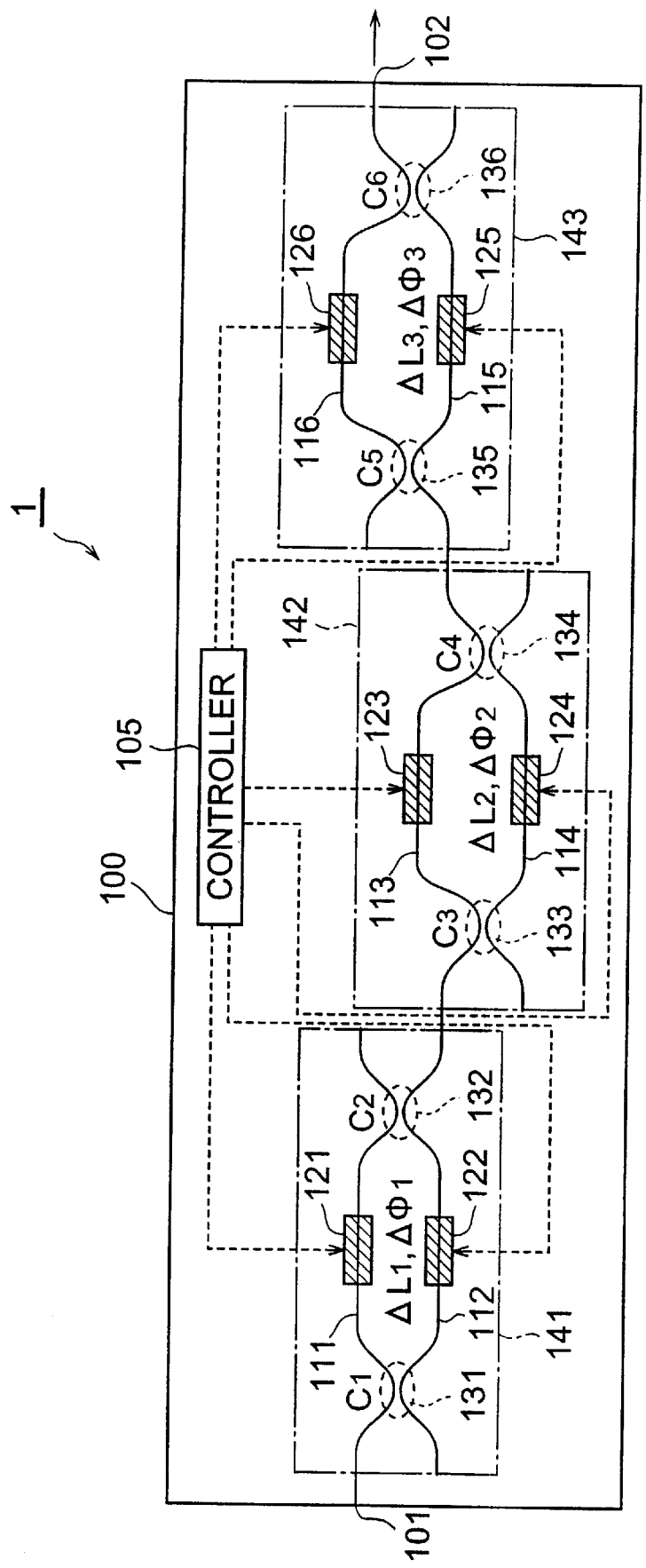
FIG. 1 is a block diagram of the first embodiment of optical filter 1 according to the present invention.

In the following the preferred embodiments of the present invention are described in detail while referencing the attached drawings. To facilitate the comprehension of the explanation, the same reference numerals denote the same parts, where possible, throughout the drawings, and a repeated explanation will be omitted.

First Embodiment

The first embodiment of an optical filter according to the present inventions will be described. FIG. 1 is a block diagram of an optical filter of this first embodiment. Optical filter 1 of this embodiment is a planar optical waveguide type circuit formed on a substrate 100, and comprises a first optical path 111, a second optical path 112, a third optical path 113, a fourth optical path 114, a fifth optical path 115, a sixth optical path 116, heaters 121 to 126, and a controller 105.

The first optical path 111 guides light that is input to optical input terminal 101, which is on one of the end faces of the substrate 100. The first optical path 111 and the second optical path 112, are optically coupled to each other by the first optical coupler 131 and the second optical coupler 132, respectively, and consist the first Mach-Zehnder interferometer 141.

The heater 121 is disposed on the first optical path 111 between the first optical coupler 131 and second optical coupler 132, and adjusts the temperature of the first optical path 111. The heater 122 is disposed on the second optical path 112 between the first optical coupler 131 and second optical coupler 132, and adjusts the temperature of the second optical path 112. These heaters 121 and 122 are used as the first temperature adjusting means, and adjust the amount of phase shift $\Delta\phi_1$ of the first optical path 111 and second optical path 112 in the first Mach-Zehnder interferometer 141 under the control of controller 105.

The third optical path 113 is connected to the second optical path 112, and guides light guided through the first optical coupler 131 and second optical coupler 132. The third optical path 113 and fourth optical path 114 are optically coupled with third optical coupler 133 and fourth optical coupler 134, respectively, and consist the second Mach-Zehnder interferometer 142.

The heater 123 is disposed on the third optical path 113 between the third optical coupler 133 and fourth optical coupler 134, and adjusts the temperature of the third optical path 113. The heater 124 is disposed on the fourth optical path 114 between the third optical coupler 133 and fourth optical coupler 134, and adjusts the temperature of the fourth optical path 114. These heaters 123 and 124 are used as the second temperature adjusting means, and adjust the amount of phase shift $\Delta\phi_2$ of the third optical path 113 and fourth optical path 114 in the second Mach-Zehnder interferometer 142 under the control of controller 105.

The fifth optical path 115 is connected to the third optical path 113, and guides light guided through third optical coupler 133 and fourth optical coupler 134. The fifth optical path 115 and sixth optical path 116 are optically coupled with fifth optical coupler 135 and sixth optical coupler 136, respectively, and consist the third Mach-Zehnder interferometer 143. The sixth optical path 116 has output terminal 102 at the end of the substrate 100.

The heater 125 is disposed on the fifth optical path 115 between the fifth optical coupler 135 and sixth optical coupler 136, and adjusts the temperature of the fifth optical path 115. The heater 126 is disposed on the sixth optical path 116 between the fifth optical coupler 135 and sixth optical coupler 136, and adjusts the temperature of the sixth optical path 116. These heaters 125 and 126 are used as the third temperature adjusting means, and adjust the amount of phase shift $\Delta\phi_3$ of the fifth optical path 115 and sixth optical path 116 in third Mach-Zehnder interferometer 143 under the control of controller 105.

In the following, the difference in optical path lengths between the first optical path 111 and second optical path 112 in between first optical coupler 131 and second optical coupler 132 is represented by $\Delta L_1$; the difference in optical path lengths between the third optical path 113 and fourth optical path 114 in between the third optical coupler 133 and fourth optical coupler 134 is represented by $\Delta L_2$; and the difference in optical path lengths between the fifth optical path 115 and sixth optical path 116 in between the fifth optical coupler 135 and sixth optical coupler 136 is represented by $\Delta L_3$. In addition, the power coupling ratio of light in the first to sixth optical coupler 131 to 136 are represented by $C_1$ to $C_6$ respectively. And the effective refractive indices of first to sixth optical paths 111 to 116 are represented by $n_c$ respectively.

The transmission loss between the optical input terminal 101 and the optical output terminal 102 of optical filter 1 is represented by optical path length differences $\Delta L_1$ to $\Delta L3$, phase shifts $\Delta\phi_1$ to $\Delta\phi_3$, power coupling ratios $C_1$ to $C_6$, effective refractive indices $n_{eff}$, and wavelength $\lambda$ of the light. In other words, the transmission loss across this optical filter 1 is dependent on wavelength $\lambda$. Also, that wavelength dependency is adjustable by phase shifts $\Delta\phi_1$ to $\Delta\phi_3$ with the adjustment of the respective temperatures of the first to sixth optical paths 111 to 116 by heaters 121 to 126 under the control of controller 105.

In the optical filter 1 of this embodiment, the first optical path 111 and second optical path 112 have the same optical path lengths between the first optical coupler 131 and second optical coupler 132, the third optical path 113 and fourth optical path 114 have different optical path lengths between the third optical coupler 133 and fourth optical coupler 134, and the fifth optical path 115 and sixth optical path 116 have different optical path lengths between the fifth optical coupler 135 and sixth optical coupler 136.

According to the above configuration, the optical filter 1 can adjust the absolute value of transmission loss in a given wavelength band with the temperature adjustment by heaters 121 to 126, and in addition, can adjust independently the slope of transmission loss for wavelengths in a given wavelength band. In the following, the respective values of each parameter of this optical filter 1 are set as $\Delta L_1=0$; $\Delta L_2=20.84$ $\mu$m; $\Delta L_3=18.71$ $\mu$m; $C_1=0.5$; $C_2=0.5$; $C_3=0.16$; $C_4=0.16$; $C_5=0.13$; $C_6=0.87$; and $n_{eff}=1.45$.

Figure 2:
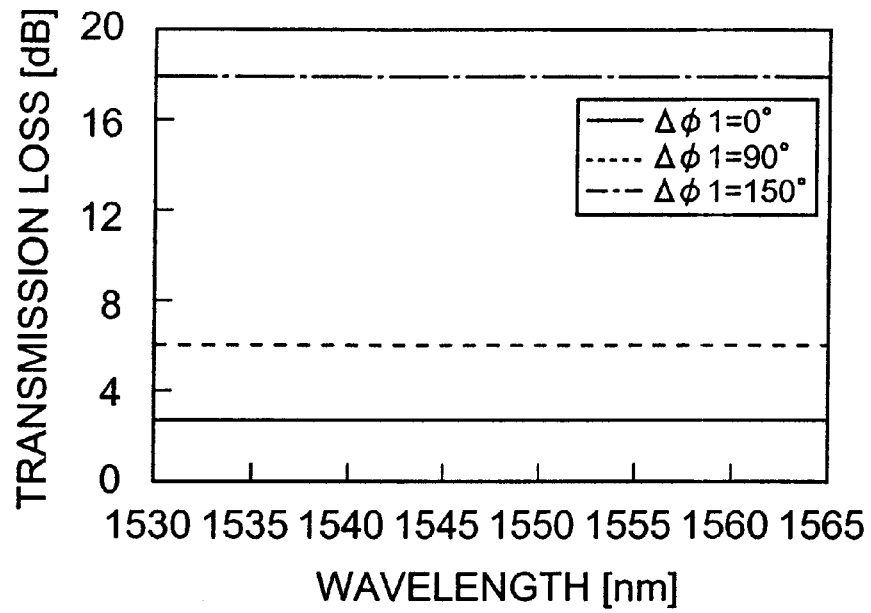
FIGS. 2 to 4 are diagrams respectively showing the wavelength characteristics of transmission loss in optical filter 1 of the first embodiment.
Figure 3:
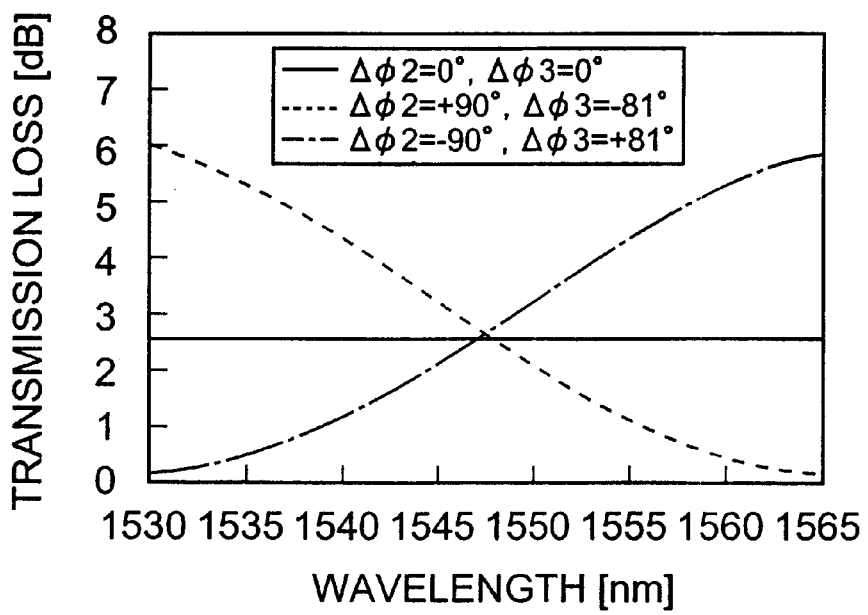
Figure 4:
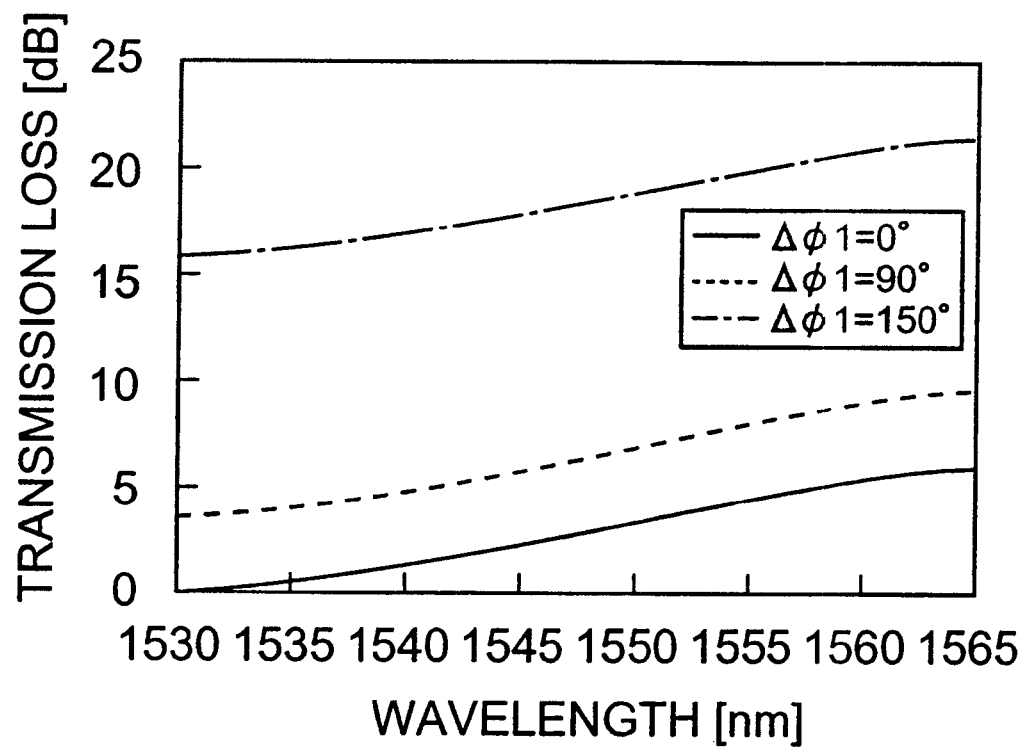

The respective FIGS. 2 to 4 are diagrams showing the wavelength dependency of transmission loss in optical filter 1 of this first embodiment. In FIG. 2, the values $\Delta\phi_2$ and $\Delta\phi_3$ are fixed to be 0°, and the value of $\Delta\phi_1$ is changed to 0°, 90°, or 150°. In this case, the optical filter 1 adjusts the absolute value of transmission loss in the 1530 nm to 1565 nm wavelength band with the adjustment of phase shift $\Delta\phi_1$ as controlling the respective temperatures of first optical path 111 and second optical path 112 with heaters 121 and 122 by the controller 105. In this optical filter 1, the absolute value of transmission loss can be adjusted within a range of 15 dB. However, in optical filter 1, the transmission loss within this wavelength band barely changes against the possible wavelength change so that the shape of the transmission loss slope remains almost fixed.

In FIG. 3, the value of $\Delta\phi_1$ is fixed to 0, and the values of $\Delta\phi_2$ and $\Delta\phi_3$ is changed to $\Delta\phi_2=\Delta\phi_3=0°$, $\Delta\phi_2=+90°$ and $\Delta\phi_3=-81°$, or $\Delta\phi_2=-90°$ and $\Delta\phi_3=+81°$, respectively. In this case, in optical filter 1, the shape of the loss slope in the 1530 nm to 1565 nm wavelength band is adjusted with the adjustment of phase shifts $\Delta\phi_2$ and $\Delta\phi_3$ as controlling the respective temperatures of third optical path 113 through sixth optical path 116 with heaters 123 to 126 by the controller 105. The transmission loss slope of this optical filter 1 can be adjusted with a range of −5.8 dB/35 nm to +5.8 dB/35 nm. However, in optical filter 1, the absolute value of transmission loss barely changes, remaining almost fixed near the median wavelength 1547 nm of this wavelength band.

In FIG. 4, the values of $\Delta\phi_2$ and $\Delta\phi_3$ are fixed to −90° and +81°, respectively, and the value of $\Delta\phi_1$ is changed to 0°, 90°, or 150°. In this case, in optical filter 1, the absolute value of transmission loss in the 1530 nm to 1565 nm wavelength band is adjusted with the adjustment of phase shift $\Delta\phi_1$, as controlling the respective temperatures of first optical path 111 and second optical path 112 with heaters 121 and 122 by the controller 105. However, in optical filter 1, the shape of the loss slope remains almost fixed in this wavelength band.

In the above manner, in optical filter 1 according to this embodiment, phase shift $\Delta\phi_1$ is adjusted with the adjustment of the respective temperatures of the first optical path 111 and second optical path 112 using heaters 121 and 122 controlled by controller 105, so that the absolute value of the transmission loss in the wavelength band of 1530 nm to 1565 nm can be controlled. In addition, in optical filter 1, phase shifts $\Delta\phi_2$ and $\Delta\phi_3$ are adjusted with the adjustment of the respective temperatures of third optical path 113 to sixth optical path 116 using heaters 123 to 126 controlled by controller 105, so that the slope of the transmission loss in wavelengths in the above-mentioned wavelength band can be controlled. Furthermore, in optical filter 1, the absolute value of loss and the loss slope can be controlled independently.

In this embodiment, Peltier devices may be provided instead of the heaters 121 to 126 to raise or lower the temperature of the first optical path 111 to sixth optical path 116. When Peltier devices are used instead of heaters, the Peltier device may be provided on only one of either first optical path 111 (or third optical path 113 or fifth optical path 115) or second optical path 112 (or fourth optical path 114 or sixth optical path 116).

It is preferable that optical filter 1 according to the present embodiment be used as, for example, a gain equalizer in an optical amplifier. That is to say, when the loss through the optical transmission path of the front portion of an optical amplifier changes due to some undisclosed reason, the power of the optical signal that is input to the optical amplifier changes in order to keep fixed the power of the optical signal that is output from the optical amplifier, and the gain in the optical amplification of the optical signal in the optical amplifier is changed. When the gain is changed, the wavelength dependency of gain, or in other words, the gain slope varies and as a result the gain flatness of the optical amplifier is lost. However, if optical filter 1 according to this embodiment is used as a gain equalizer in an optical amplifier, by adjusting the respective phase shifts $\Delta_2$ and $\Delta\phi_3$, or in other words the value of the loss slope, of optical filter 1 corresponding to the input optical signal power, it is possible to compensate the change in the gain slope accompanying the change in the input optical signal power with the loss slope of optical filter 1. Furthermore, by adjusting the value of phase shift $\Delta\phi_1$, or in other words the absolute value of loss, of optical filter 1, it is possible to adjust the output optical signal power.

Furthermore, at this time, even if the loss slope of optical filter 1 changes, since it is possible to suppress the loss in the optical signal wavelength band in optical filter 1 while maintaining that shape of loss slope, there is no deterioration of the S/N ratio of the optical signal that is amplified and output. In particular, in the case where the optical signal wavelength band or median wavelength is set such as mentioned above, it is preferable that optical filter 1 of the present embodiment be used as a gain equalizer that equalizes the gain characteristics of the optical amplifier provided in, for example, the repeater of an optical transmission system that transmits optical signals of multiple wavelengths in the 1.55 $\mu$m wavelength band or the 1.59 $\mu$m wavelength band.

The array of each Mach-Zehnder interferometer is not limited to the array described in the above embodiment, the first Mach-Zehnder interferometer 141 having same optical path lengths maybe disposed between or after the Mach-Zehnder interferometers 142 and 143. Moreover, it is possible to use various combinations of connections of optical paths of respective Mach-Zehnder interferometers 141, 142, and 143. For example, the case that the Mach-Zehnder interferometers 141, 142, and 143 are connected in series in this order as shown in FIG. 1 will be described. For the connection between first Mach-Zehnder interferometer 141 and second Mach-Zehnder interferometer 142, besides connecting the second optical path 112 and third optical path 113 as shown in FIG. 1, it is possible to connect the first optical path 111 and third optical path 113, or connect the first optical path 111 and fourth optical path 114, or even connect the second optical path 112 and fourth optical path 114. In the same manner, for the connection between the second Mach-Zehnder interferometer 142 and third Mach-Zehnder interferometer 143, besides connecting the third optical path 113 and fifth optical path 115 as shown in FIG. 1, it is possible to connect the third optical path 113 and sixth optical path 116, or connect the fourth optical path 114 and fifth optical path 115, or even connect the fourth optical path 114 and sixth optical path 116. Even when the array of the Mach-Zehnder interferometers is changed, it is possible to realize various alternative optical path connections in the same manner, but in either case, the same effects as with this embodiment can be obtained.

Second Embodiment

Figure 5:
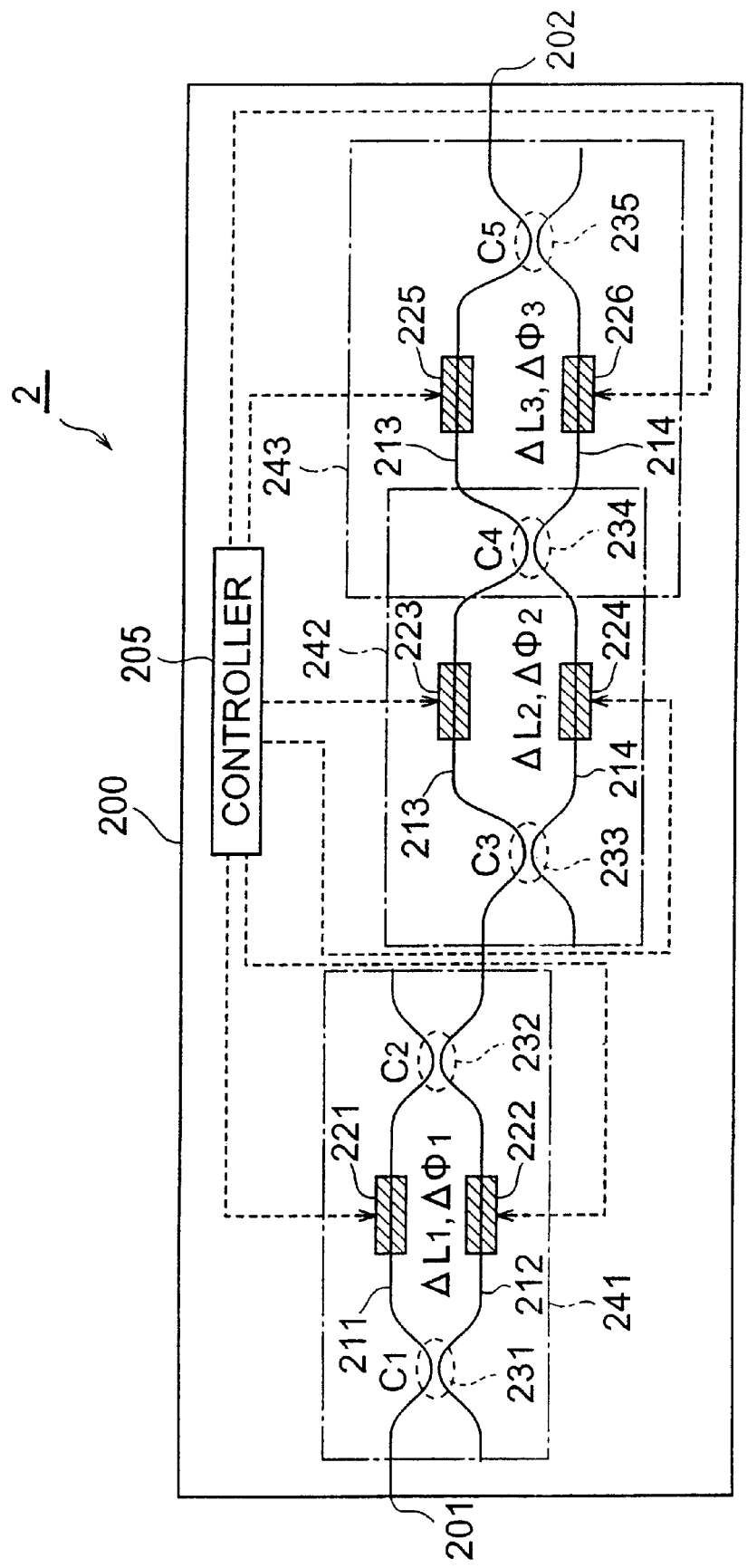
FIG. 5 is a block diagram of the second embodiment of optical filter 2 according to the present invention.

Next, the second embodiment of an optical filter according to the present invention will be described. FIG. 5 is a block diagram of optical filter 2 according to the present embodiment. Optical filter 2 according to this embodiment is a planar optical waveguide type circuit formed on the substrate 200, and comprises a first optical path 211, a second optical path 212, a third optical path 213, a fourth optical path 214, heaters 221 to 226, and controller 205.

The first optical path 211 guides light that is input to optical input terminal 201, which is on one of the end faces of substrate 200. The first optical path 211 and the second optical path 212 are optically coupled to each other by the first optical coupler 231 and the second optical coupler 232, respectively, and consists the first Mach-Zehnder interferometer 241.

The heater 221 is disposed on the first optical path 211 between the first optical coupler 231 and second optical coupler 232, and adjusts the temperature of the first optical path 211. The heater 222 is disposed on the second optical path 212 between the first optical coupler 231 and second optical coupler 232, and adjusts the temperature of the second optical path 212. These heaters 221 and 222 are used as the first temperature adjusting means, and adjust the amount of phase shift $\Delta\phi_1$ of the first optical path 211 and second optical path 212 in the first Mach-Zehnder interferometer 241 under the control of controller 205.

The third optical path 213 is connected to the second optical path 212, and guides light guided through the first optical coupler 231 and second optical coupler 232, and outputs it from optical output terminal 202. The third optical path 213 and fourth optical path 214 are optically coupled to each other with third optical coupler 233, fourth optical coupler 234, and fifth optical coupler 235, respectively. The third optical path 213, fourth optical path 214, third optical coupler 233, and fourth optical coupler 234 consist the second Mach-Zehnder interferometer 242. Furthermore, the third optical path 213, fourth optical path 214, fourth optical coupler 234, and fifth optical coupler 235 consist the third Mach-Zehnder interferometer 243.

The heater 223 is disposed on the third optical path 213 between the third optical coupler 233 and fourth optical coupler 234, and adjusts the temperature of the third optical path 213. The heater 224 is disposed on the fourth optical path 214 between the third optical coupler 233 and fourth optical coupler 234, and adjusts the temperature of the fourth optical path 214. These heaters 223 and 224 are used as the second temperature adjusting means, and adjust the amount of phase shift $\Delta\phi_2$ of the third optical path 213 and fourth optical path 214 in second Mach-Zehnder interferometer 242 under the control of controller 205.

The heater 225 is disposed on the third optical path 213 between the fourth optical coupler 234 and fifth optical coupler 235, and adjusts the temperature of third optical path 213. The heater 226 is disposed on the fourth optical path 214 between the fourth optical coupler 234 and fifth optical coupler 235, and adjusts the temperature of the fourth optical path 214. These heaters 225 and 226 are used as the third temperature adjusting means, and adjust the amount of phase shift $\Delta\phi_3$ of the third optical path 213 and fourth optical path 214 in the third Mach-Zehnder interferometer 243 under the control of controller 205.

In the following, the difference in optical path lengths between the first optical path 211 and second optical path 212 in between the first optical coupler 231 and second optical coupler 232 is represented by $\Delta L_1$; the difference in optical path lengths between the third optical path 213 and fourth optical path 214 in between the third optical coupler 233 and fourth optical coupler 234 is represented by $\Delta L_2$; and the difference in optical path lengths between the third optical path 213 and fourth optical path 214 in between the fourth optical coupler 234 and fifth optical coupler 235 is represented by $\Delta L_3$. In addition, the power coupling ratio of light in the first optical coupler 231 to fifth optical coupler 235 are represented by $C_1$ to $C_5$. Furthermore, the respective effective refractive indices of the first optical path 211 to sixth optical path 216 are represented by $n_c$.

The transmission loss between the optical input terminal 201 and optical output 202 of optical filter 2 is represented by optical path length differences $\Delta L_1$ to $\Delta L_3$, phase shifts $\Delta\phi_1$ to $\Delta\phi_3$, power coupling ratios $C_1$ to $C_5$, effective refractive indices $n_{eff}$, and wavelength $\lambda$ of the light. In other words, the transmission loss across this optical filter 2 is dependent on wavelength $\lambda$. Also, that wavelength dependency is adjustable by phase shifts $\Delta\phi_1$ to $\Delta\phi_3$ with adjustment of the respective temperatures of the first to sixth optical path 211 to 216 by heaters 221 to 226 under the control of controller 205.

In the optical filter 2 of this embodiment, the first optical path 211 and second optical path 212 have the same optical path lengths between the first optical coupler 231 and second optical coupler 232, the third optical path 213 and fourth optical path 214 have the different optical path lengths between the third optical coupler 233 and fourth optical coupler 234 and between the fourth optical coupler 234 and fifth optical coupler 235, respectively.

According to the above configuration, the optical filter 2 can adjust the absolute value of transmission loss in a given wavelength band with the temperature adjustment by heaters 221 to 226, and in addition, can independently adjust the slope of the transmission loss for wavelengths in a given wavelength band. In the following, the respective values of each parameter of this optical filter 2 are set as $\Delta L_1 = 0$; $\Delta L_2 = 6.95$ μm; $\Delta L_3 = 16.57$ μm; $C_1 = 0.5$; $C_2 = 0.5$; $C_3 = 0.28$; $C_4 = 0.72$; $C_5 = 0.5$; and $n_{eff} = 1.45$.

Figure 6:
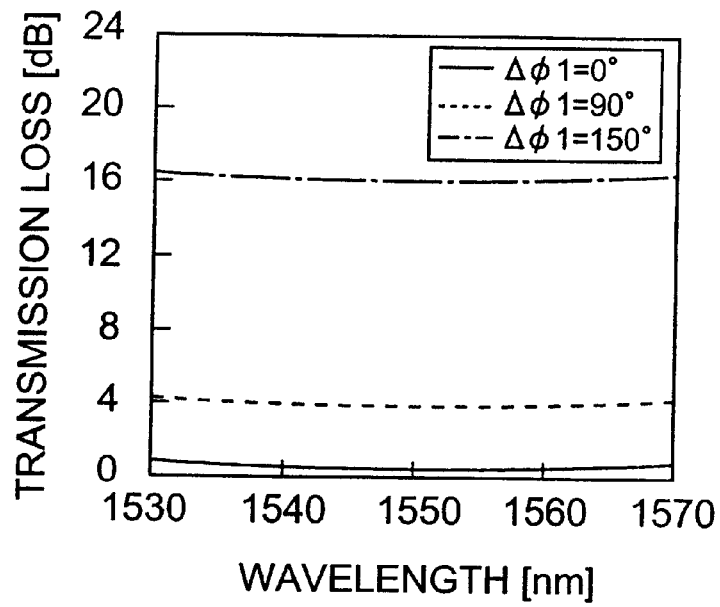
FIGS. 6 to 8 are diagrams respectively showing the wavelength characteristics of transmission loss in optical filter 2 of the second embodiment.
Figure 7:
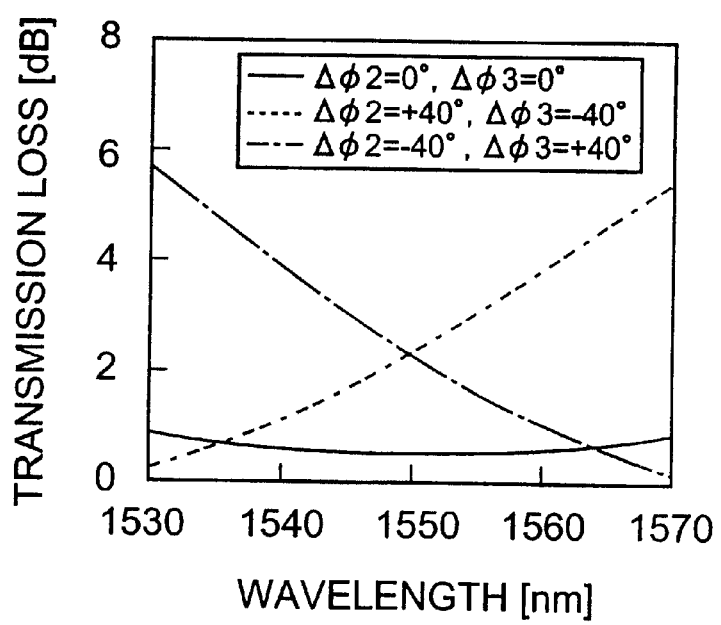
Figure 8:
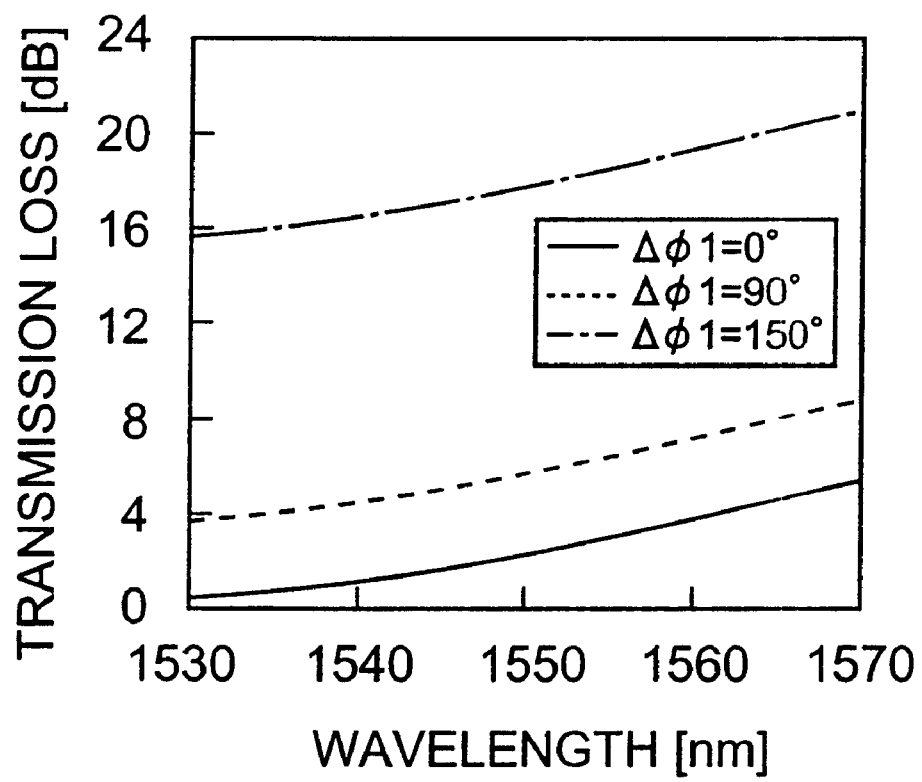

The respective FIGS. 6 to 8 are diagrams showing the wavelength dependency of transmission loss in optical filter 2 according to the second embodiment. In FIG. 6, the values $\Delta\phi_2$ and $\Delta\phi_3$ is fixed to be 0°, and the value of $\Delta\phi_1$ is changed to 0°, 90°, or 150°. In this case, the optical filter 2 adjusts the absolute value of transmission loss in the 1530 nm to 1570 nm wavelength band with the adjustment of phase shift $\Delta\phi_1$ as controlling the respective temperatures of first optical path 211 and second optical path 212 with heaters 221 and 222 by the controller 205. In this optical filter 2, the absolute value of transmission loss can be adjusted within a range of 15 dB. However, in optical filter 2, the transmission loss within this wavelength band barely changes against the possible wavelength change so that the shape of the transmission loss slope remains almost fixed.

In FIG. 7, the value of $\Delta\phi_1$ is fixed to 0° is fixed, and the values of $\Delta\phi_2$ and $\Delta\phi_3$ is changed to $\Delta\phi_2=\Delta\phi_3=0°$, $\Delta\phi_2=+40°$ and $\Delta\phi_3=-40°$, or $\Delta\phi_2=-40°$ and $\Delta\phi_3=+40°$, respectively. In this case, in optical filter 2, the shape of the loss slope in the 1530 nm to 1570 nm wavelength band is adjusted with the adjustment of phase shifts $\Delta\phi_2$ and $\Delta\phi_3$ as controlling the respective temperatures of third optical path 213 and fourth optical path 214 with heaters 223 to 226 by the controller 205. The transmission loss slope of this optical filter 2 can be adjusted with a range of −5.2 dB/40 nm to +5.2 dB/40 nm. Also, in comparison with FIG. 3 in the first embodiment, with this optical filter 2, the absolute value of loss is smaller in this wavelength band.

In FIG. 8, the values of $\Delta\phi_2$ and $\Delta\phi_3$ are fixed to +40° and −40° respectively, and the value of $\Delta\phi_1$ is changed to 0°, 90°, or 150°. In this case, in optical filter 2, the absolute value of transmission loss in the 1530 nm to 1570 nm wavelength band is adjusted with the adjustment of phase shift $\Delta\phi_1$ as controlling the respective temperatures of first optical path 211 and second optical path 212 with heaters 221 and 222 by controller 205. However, in optical filter 2, the shape of the loss slope remains almost fixed in this wavelength band.

In the above manner, in optical filter 2 according to this embodiment, the phase shift $\Delta\phi_1$ is adjusted by the adjustment of the respective temperatures of the first optical path 211 and second optical path 212 using heaters 221 and 222 controlled by controller 205, so that the absolute value of transmission loss in the wavelength band of 1530 nm to 1570 nm can be controlled. In addition, in optical filter 2, phase shifts $\Delta\phi_2$ and $\Delta\phi_3$ are adjusted with the adjustment of the respective temperatures of third optical path 213 and fourth optical path 214 using heaters 223 to 226 controlled by controller 205, so that the slope of the transmission loss in wavelengths in the above-mentioned wavelength band can be controlled. Furthermore, in optical filter 2, the absolute value of transmission loss and the transmission loss slope can be each independently controlled.

In this embodiment, Peltier devices may be provided instead of heaters 221 to 226 to raise and lower the respective temperatures of first optical path 211 to fourth optical path 214. When Peltier devices are used instead of heaters, the Peltier device may be provided on only one of either first optical path 211 (or third optical path 213) or second optical path 212 (or fourth optical path 214).

It is also preferable that optical filter 2 according to this embodiment, in the same manner as with optical filter 1, be used as a gain equalizer in, for example, an optical amplifier.

Furthermore, at this time, even if the loss slope of optical filter 2 changes, since it is possible to suppress the transmission loss in the optical signal wavelength band in optical filter 2 while maintaining that shape of loss slope, there is no deterioration of the S/N ratio of optical signal that is amplified and output. In particular, in the case where the optical signal wavelength band or median wavelength is set such as mentioned above, it is preferable that optical filter 2 according to this embodiment be used as a gain equalizer that equalizes the gain characteristics of the optical amplifier provided in, for example, a repeater in an optical transmission system that transmits optical signals of multiple wavelengths in the 1.55 $\mu$m wavelength band or the 1.59 $\mu$m wavelength band.

The array of each Mach-Zehnder interferometer is not limited to the array mentioned above, the single Mach-Zehnder interferometer 241 may be disposed after the duplex Mach-Zehnder interferometer 242 and 243. Moreover, it is possible to use various combinations for the connections between both Mach-Zehnder interferometers. For example, an example of the case where Mach-Zehnder interferometers 241, 242, and 243 are connected in that order as shown in FIG. 5. For the connection between Mach-Zehnder interferometer 241 and Mach-Zehnder interferometer 242, besides the connecting second optical path 212 and third optical path 213 as shown in FIG. 5, it is also possible to connect the first optical path 211 and third optical path 213, or connect the first optical path 211 and fourth optical path 214, or even connect the second optical path 212 and fourth optical path 214.

The present invention is not limited to the embodiments described in the above, but may include various alternatives. For example, in the embodiments mentioned above, the optical filter has each structural component formed on a substrate and integrated, which is preferable from the standpoint of easier handling. However, the optical filter according to the present invention may have each optical path comprise optical fiber, and each optical coupler comprise an optical fiber coupler. Such cases are preferable in the fact that insertion loss is low when providing this optical filter upon an optical fiber transmission path.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical filter having variable wavelength-dependent transmission loss within given wavelength band comprising:

an optical waveguide section composed of first, second and third Mach-Zehnder interferometers, each having two optical paths and two optical couplers for optical connecting said two optical paths each other at both end, said Mach-Zehnder interferometers are connected in series, and only one of said Mach-Zehnder interferometers having same optical path lengths between said optical couplers;

first, second and third temperature adjusting means, each disposed in at least one of optical paths between said optical couplers in respective first, second and third Mach-Zehnder interferometers, for adjusting the respective temperatures of said optical paths; and control means, for independently controlling the absolute value and the slope of transmission loss by controlling respective temperatures of said optical paths with said temperature adjusting means.

2. An optical filter according to claim 1, wherein the bandwidth of said given wavelength band is 35 nm or wider, and the variable range of the absolute value of transmission loss in said given wavelength is 10 dB or more, and the absolute value of the slope of transmission loss in said given wavelength is variable at least within the range of 0 to 5 dB/35 nm.

3. An optical filter having variable wavelength-dependent transmission loss within given wavelength band comprising:

a single Mach-Zehnder interferometer composed of two optical paths having same optical path lengths and two optical couplers connecting said optical paths to each other;

a duplex Mach-Zehnder interferometer composed of main optical path connected to one input or output end of said single Mach-Zehnder interferometer, sub optical path, end optical couplers disposed at both ends of said main and sub optical paths for optical coupling said main and sub optical path to each other, and middle optical coupler disposed at middle position of said main and sub optical paths for optical coupling said main and sub optical paths to each other and wherein said main optical path and said sub optical path have different optical path lengths between adjacent optical couplers;

a first temperature adjusting means disposed in at least one of optical paths between said optical couplers in said single Mach-Zehnder interferometer, for adjusting the temperature of said optical path;

second and third temperature adjusting means, each disposed in at least one of main or sub optical paths between said middle optical coupler and end optical couplers respectively in said duplex Mach-Zehnder interferometers, for adjusting the respective temperature of said optical paths; and controlling means, for independently controlling the absolute value and the slope of transmission loss by controlling respective temperatures of said optical paths with said temperature adjusting means.

4. An optical filter according to claim 3, wherein the bandwidth of said given wavelength band is 35 nm or wider, and the variable range of the absolute value of transmission loss in said given wavelength is 10 dB or more, and the absolute value of the slope of transmission loss in said given wavelength is variable at least within the range of 0 to 5 dB/35 nm.

* * * * *